L. T. ROBINSON & O. HOLZ.
M. D. HOLZ, EXECUTRIX OF O. HOLZ, DEC'D.
ELECTRICAL MEASURING INSTRUMENT.
APPLICATION FILED SEPT. 30, 1909.

1,073,632.

Patented Sept. 23, 1913.

2 SHEETS—SHEET 1.

Witnesses:
Earl G. Klock.
J. Ellis Glen

Inventors:
Lewis T Robinson,
Otto Holz, deceased,
Matie D Holz, executrix,
by Albert S. Dorr
Their Attorney.

UNITED STATES PATENT OFFICE.

LEWIS T. ROBINSON, OF SCHENECTADY, AND OTTO HOLZ, DECEASED, BY MATIE D. HOLZ, EXECUTRIX, OF SCHENECTADY, NEW YORK, ASSIGNORS TO GENERAL ELECTRIC COMPANY, A CORPORATION OF NEW YORK.

ELECTRICAL MEASURING INSTRUMENT.

1,073,632.      Specification of Letters Patent.     Patented Sept. 23, 1913.

Application filed September 30, 1909. Serial No. 520,432.

*To all whom it may concern:*

Be it known that I, LEWIS T. ROBINSON, a citizen of the United States, residing at Schenectady, county of Schenectady, State of New York, did jointly with OTTO HOLZ, deceased, invent the certain new and useful Improvements in Electrical Measuring Instruments set forth in the following specification; and be it also known that I, MATIE D. HOLZ, a citizen of the United States, residing at Schenectady, county of Schenectady, State of New York, executrix of the estate of OTTO HOLZ, deceased, late a citizen of the United States, am informed and believe that the said OTTO HOLZ did jointly with LEWIS T. ROBINSON invent the certain new and useful Improvements in Electrical Measuring Instruments set forth in the following specification.

This invention relates to electric measuring instruments and more particularly to instruments used for determining the relation between the impressed voltage and the current in an alternating current circuit, and thereby indicating the power factor of the circuit.

In the single phase power factor indicators generally used a change in frequency will cause the readings of the instrument to be erroneous, and the object of this invention is to improve power factor indicators and similar instruments and render the indications accurate irrespective of the variations of frequency which always occur on commercial circuits.

This invention will best be understood in connection with the accompanying drawing, which illustrates diagrammatically some of the numerous forms in which the invention may be embodied, and in which—

Figure 1:
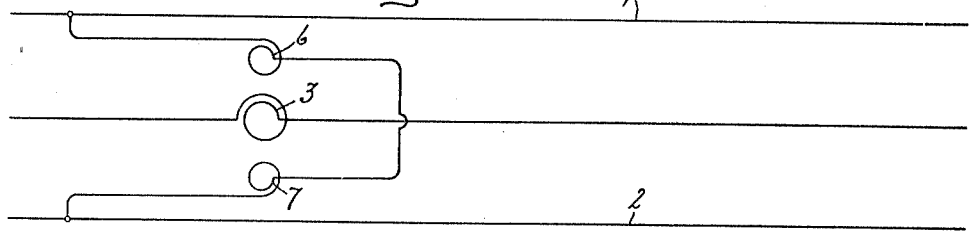
Figure 2:
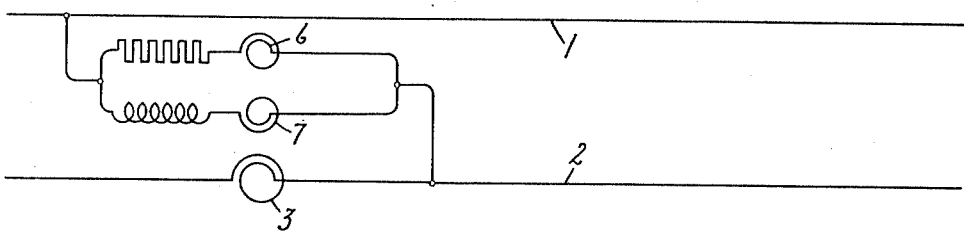
Figure 3:
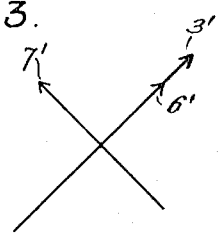
Figure 4:
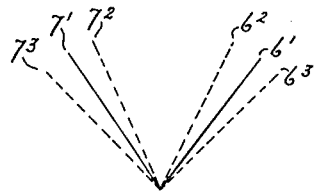
Figure 5:
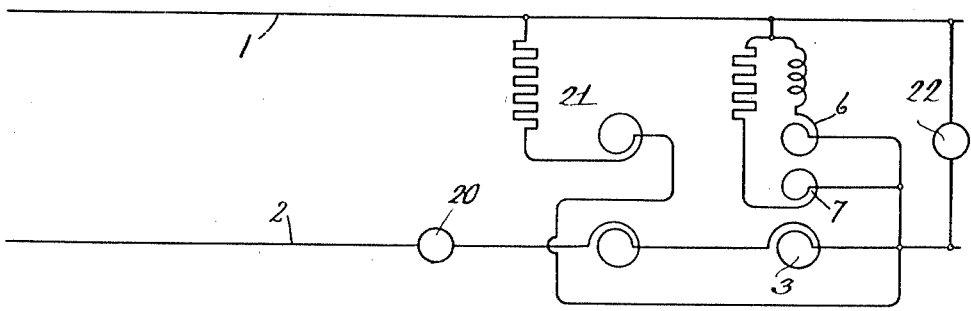
Figure 6:
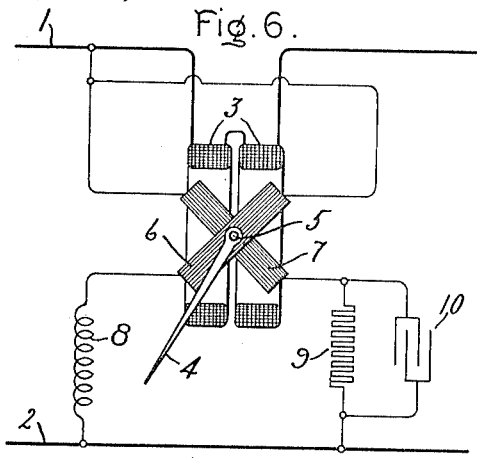
Figure 7:
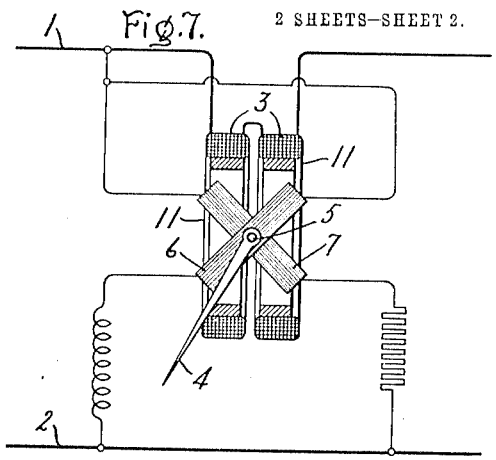
Figure 8:
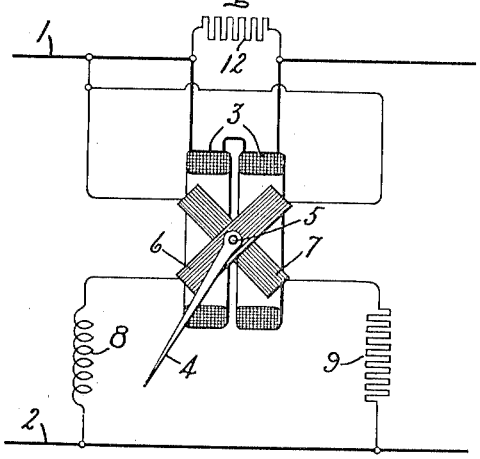
Figure 9:
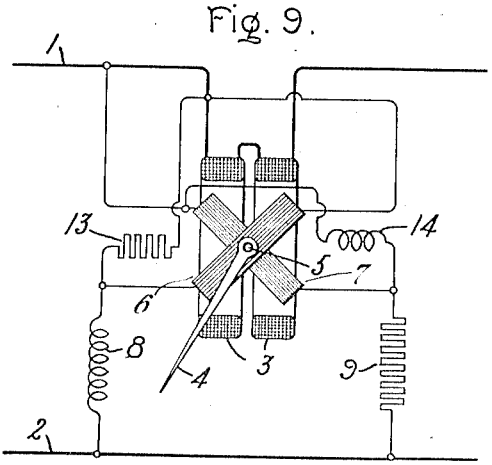
Figure 10:
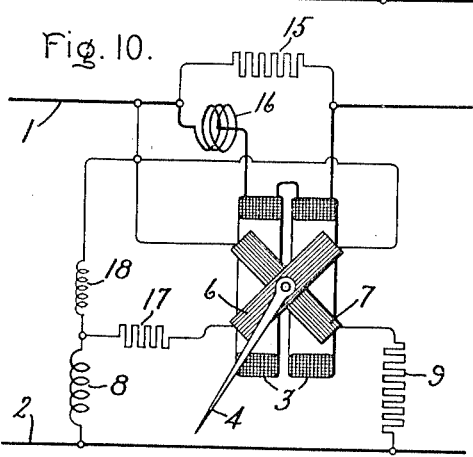

Figure 1 shows a previously known satisfactory type of power factor instrument for balanced three-phase circuits with two potential coils connected across the outside wires and a series coil connected in the third wire; Fig. 2 shows a method of producing phase differences between the currents in the two potential coils in an instrument connected to a single phase circuit; Fig. 3 is a diagram of the magnetic fluxes in the two potential coils; Fig. 4 is a diagram, showing the cause of error with change of frequency; Fig. 5 shows the method of calibrating a single-phase instrument according to our invention and determining relative values of the factors to make its indications accurate; Fig. 6 shows an instrument embodying our invention, in which the rotating field due to the potential coils is controlled; Fig. 7 a form in which the phase relation of the field produced by the current coil to the potential coils is varied; Fig. 8 a form embodying another mode of controlling the phase relation of the field due to the current coil; Fig. 9 a form embodying a different mode of controlling the rotating field due to the potential coils; Fig. 10 an instrument in which the relation of the field produced by the current to the rotating field produced by the potential coils is varied; and Fig. 11 an instrument in which the effects of frequency are minimized by means of a short circuiting ring on the movable element.

Power factor indicators are satisfactory on three-phase balanced circuits when constructed according to the methods disclosed in Holz's Patent No. 729,343. As usually made, these have one current coil and two potential coils, and they may be connected to a three-wire three-phase circuit in the manner shown in Fig. 1. Such an instrument is not directly applicable to a single-phase circuit, or to other forms of circuits which require a knowledge of the power factor in a branch equivalent to a single-phase circuit.

In order to construct an instrument which will operate on a single-phase circuit, or its equivalent, it is necessary to produce a difference in phase between the current in the two potential coils, and this difference of phase may have almost any magnitude from a comparatively small angle up to 90 degrees or more. Combinations using reactance or capacity may be used. The most obvious and generally satisfactory plan is an arrangement using a reactance, as shown in Fig. 2, in which 1 and 2 represent the two sides of the circuit, and 6 and 7 potential coils; one including a resistance and the other a reactance in series with it. This gives a current in one moving coil, which may be fixed at approximately 90 degrees difference in phase from that in the other. In an instrument arranged in this way with the same mechanical angle between the axis of the fluxes generated by the two moving coils, as the electrical angle between the currents in the coil, and the ampere turns in each potential coil equal, the moving system will take up a position with reference to the flux created by the current coil, such that on unity power factor the moving coils will be displaced so that one coil will be in line with and the other coil displaced 90 degrees from the axis of flux in the current coil 3. A complete explanation covering this point is not necessary. The stable conditions may be represented as in Fig. 3, in which 3' is the direction of current coil flux, while 6' and 7' are the directions of the fluxes due to the potential coils.

By means of well known relations it can be shown that if the frequency remains constant such an instrument will always move to such a position that the rotating vector of flux generated by the moving coils is in line with the direction of the flux generated by the fixed coil when the latter flux passes through a maximum. If the power factor of the circuit changes the time phase relation of the rotating field, formed by the moving coils, as related to the electromotive force will not be altered, but the time of the maximum current, and hence the maximum flux in the series current coil will be advanced or delayed. Therefore, when the power factor changes on the system the pointer of such an instrument will move through an angle, which may be referred to a scale graduated in terms of power factor, or of phase angle between the current and electromotive force in the circuit.

Our present invention relates to means which may be employed so that the indications obtained, as above, on the instrument will remain practically unchanged when the frequency is varied up or down from the normal value by an amount equal to that found on commercial circuits, say by a maximum of 10 per cent.

If the frequency changes the flux in the inductive potential circuit will, depending on the direction of phase rotation, be shifted from the position 6' in Fig. 4 to a position at $6^2$ or $6^3$. Such a change will bring about a changed relation between the rotating vector of flux generated by the moving coils and the electromotive force, and as a consequence the indicating pointer on the instrument will move, with reference to the scale, although the power factor of the circuit remains constant, the extent of the movement depending on the specific arrangement of the instrument and the magnitude of the various quantities involved. This false indication of the pointer can be corrected, in three ways in accordance with our invention: (1) We can restore the phase of the current in the inductive potential circuit; (2) the other potential circuit can be altered in phase by an equal and opposite amount to the relative positions $7^2$, $7^3$, or (3) the relative phase in the current winding may be changed. Some of the means for effecting the desired result in each case are shown in Figs. 6, 7, 8, 9, 10 and 11, although corrections can also be applied in other ways than those shown, that is, the characteristics of the instruments to be corrected must be known before the specific form of application required can be determined. Under certain circumstances, for instance, it might be necessary, in Fig. 9, to exchange the reactance and the resistance in order to accomplish the required result.

In carrying out the invention in practice we may construct the instrument in any of the ways shown in Figs. 6 to 11. In these figures the essential parts of the usual type of power factor indicator are designated by the same reference characters. The instrument is connected to the leads 1 and 2 of the alternating current system, on which it is used and the fixed field coils 3 are connected in series with one lead for the purpose of producing a magnetic field dependent upon current in the circuit. The movable element of the instrument carries a pointer 4, which swings over some suitable scale not shown, and which is mounted on a shaft 5 free to rotate without restraint into any angular position with relation to the field coils. On the shaft 5 are fixedly secured two potential coils 6 and 7, coil 6 being connected between the leads 1 and 2 across the alternating current circuit through a reactance 8. The coils are usually mounted at an angle of 90° with each other. It is not essential that the two coils of the moving system be displaced 90 degrees, as any other angle might be used, but it should be the same as the electrical angle to secure a uniform scale and to produce a desired scale a suitable angle should be selected. The reactance renders the circuit through the coil 6 highly inductive and causes the current which flows through that coil to lag approximately 90° with reference to the impressed voltage on the leads 1 and 2. The two potential coils 6 and 7 coöperate to produce a rotating field which interacts with the field of the field coil 3 and the relation of these two fields determines the position of the pointer of the instrument. Owing to the inductance in the circuit of the coil 6 the angle of lag varies with the frequency and if the frequency increases, the lag of the current through the coil becomes greater, although the power factor is unchanged, and as a result of the lag of the current through the potential coil 6 the relation of the rotating field produced by the two potential coils to the maximum flux in the field of the field coil 3 is changed and therefore false indications are caused. The second potential coil 7, which is also rigidly mounted on shaft 5, and is angularly displaced from the potential coil 6, is supplied with current substantially in phase with the impressed voltage through the non-inductive resistance 9, hence the circuit of the coil 7 is substantially non-inductive, and the phase relation of the magnetic field produced by this potential coil to the impressed voltage is substantially independent of frequency.

The stable position of the movable element depends upon the relation of the rotating field produced by the potential coils 6 and 7 to the field produced by the field coil 3 and a change in frequency which causes a change in the phase relation of the current in the potential coil 6 to the current in the other potential coil 7 will produce a change in relation of the produced rotary field to the field of the field coil 3 and thereby introduce errors. Means may be provided to change the phase of the current in the potential coil 6 in a direction to compensate for the ordinary changes due to frequency, or its effect can be compensated if the current through the coil 7 or the current through the field coil 3 can be shifted in phase in the proper direction and to the proper amount.

The phase relations of the currents in the coils may be altered in various ways to produce the desired result, and in the specific arrangement disclosed in Fig. 6, the phase of the current in the potential coil 7 is altered by means of a condenser 10, connected in shunt to the resistance 9. The condenser has capacity and therefore a different electrical characteristic from the non-inductive circuit through the coil 7, and the effect of the condenser in shunt is to alter the phase relation of the current through the potential coil 7 to the impressed voltage, if the frequency changes. The capacity tends to cause the current through the potential coil 7 to become leading as the frequency increases, while the same increase in frequency causes the current through the potential coil 6 to lag, and if the capacity bears the proper relation to the reactance, the rotating field produced by the interaction of the two potenital coils 6 and 7 remains in the same relation to the field of the field coil 3 and hence the effect of a change in frequency is minimized.

In the specific arrangement shown in Fig. 7, the phase of the current through the coil 6 is affected by changes in frequency, but the effect of the change in frequency on the relation of the rotating field of the coils 6 and 7 to the field of the coil 3 is counteracted by means of closed conducting rings 11 mounted around the moving element of the indicator and inside the field coils 3. These rings are short circuited and alter the phase relation of the field of the coil 3 to the impressed voltage on the alternating current circuit and by properly proportioning the rings the alteration in phase relation between the impressed voltage and the field of the field coil will tend to counteract the effect of the change in the rotating field produced by the potential coils.

In Fig. 8 the phase of the field of the field coil is also altered by means of a non-inductive resistance 12 which shunts the field coil and is of a lower time constant than the field coils.

In Fig. 9 the relation of the field produced by the two potential coils is controlled by means of a resistance 13 connected in shunt to the potential coil 6, which receives its current through the reactance 8, and also by means of a reactance 14 connected in shunt to the potential coil 7, which receives its current through the non-inductive resistance 9. Although Fig. 9 shows both the resistance 13 and the reactance 14, in many cases a correction close enough for practical purposes can be secured by the use of either the resistance 13 alone, or preferably, of the reactance 14 alone. If only the reactance 14 is used, the effect is to shift the phase of the current through the potential coil 7 and thereby counteract to a large extent the shifting of the rotating field when the frequency changes.

In the instrument shown in Fig. 10 the phase of the field of the field coil 3 is varied, and the phase of the current through the potential coil 6 is also varied in response to changes in frequency by means of a resistance 15 connected in shunt to the terminals of the field coils 3, and a reactance 16 connected in series to the field coils, and also by means of a resistance 17 connected between the reactance 8 and the potential coil 6 while both the resistance 17 and the potential coil 6 are shunted by a reactance 18.

In the arrangement shown in Figs. 9 and 10, the magnitude of the values of resistance and reactance in the several circuits must be properly selected relatively to each other to effect the best result.

Figure 11:
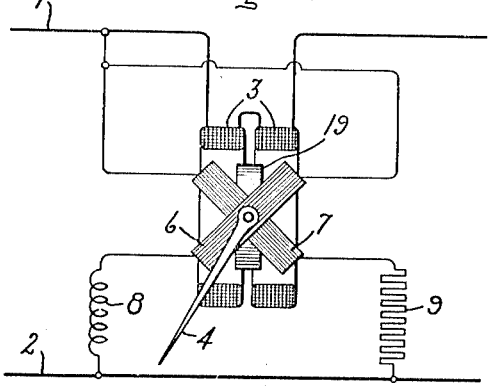

In Fig. 11 the moving element is provided with a closed conducting ring 19, in which currents are induced, and which modifies the relation of the rotating field and the field of the coil 3 to counteract to a certain extent the effect of change of frequency. This ring is preferably placed in the plane of the field coil, as shown, but if desired might be placed in the plane of one of the moving coils.

To determine the values of the impedance and capacity factors and calibrate the scale of the above described instruments, an instrument of the structure shown should be connected to a circuit, together with a voltmeter 22, ammeter 20 and wattmeter 21, as shown in Fig. 5. The circuit is then loaded with a current of proper amount for the instrument employed, and the power factor (preferably unity) determined from the equation $$\frac{W}{E \times I} = P.F.$$

where W = watts, E = impressed voltage, I = current. The frequency is held constant, and, by the use of a phase shifter, or other suitable means, the power factor on the instrument is changed and in this way the scale is graduated. The frequency of the circuit is then raised 10 per cent., or enough to cover the largest increase to be found on commercial circuits, and impedance and capacity are used to change the phase in one or more of the three circuits of the instrument until the deflections are the same at various power factors, on the standard as well as the increased frequency.

The same process is repeated with the frequency lowered by the required amount. The phase of the current in any of the circuits of the instrument may be made responsive to a change in frequency to a sufficient extent to compensate for the changes caused by one or more of the other elements, by employing any of the various methods described. On account of the fact that the instrument itself may possess resistance, reactance, capacity, eddy currents, etc., in an unknown amount, it is not possible to determine, except by trial or measurement, what circuit must be compensated, and the degree and kind of compensation which must be applied. The correct compensation having once been applied, the instrument can be used with satisfactory accuracy on circuits with frequency varying within the limits found to occur in practice.

The various forms of the invention may be embodied in power factor indicators of other design, in which all coils are stationary and act on a movable vane, since the principle is the same whether the various coils are movable or fixed.

This invention may be embodied in many other forms than shown and described in this specification, and there is no intention to limit this case to the precise arrangement disclosed, but the appended claims are intended to cover all modifications within the spirit and scope of the invention.

What we claim as new and desire to secure by Letters Patent of the United States is:

1. In an indicating instrument, the combination with two relatively movable members, means on one member for producing a magnetic field, and two angularly displaced coils on the other member, of means for connecting one of said coils in an inductive shunt circuit and a second coil in a non-inductive shunt circuit across an alternating current circuit on which the indicator is used, and means responsive to frequency for displacing the phase of the current in the second of said coils to counteract corresponding displacement in phase in the first coil by change of frequency.

2. In an indicating instrument, the combination with two relatively movable members, a coil mounted on one member, and two angularly displaced coils mounted on the other member, of means for connecting one of said coils in an inductive shunt circuit and a second in non-inductive shunt circuit across the alternating current circuit on which the indicator is used, and means differing in electrical characteristics from said non-inductive circuit connected in shunt to a part of said non-inductive circuit for displacing the phase of the current in the second of said coils.

3. In an indicating instrument, the combination with fixed means for producing a magnetic field, and a movable member having two angularly displaced coils, of means for connecting one of said coils in an inductive shunt circuit and a second in a non-inductive shunt circuit across the alternating current circuit on which the indicator is used, and a reactance in shunt with a portion of said non-inductive circuit, whereby the phase of the current in the second of said coils is displaced by changes of frequency to counteract a corresponding displacement of phase in the first coil.

4. A power factor indicator comprising three coils, two of which are angularly displaced, and means coöperating with said angularly displaced coils comprising a reactance in series with and a resistance in shunt with one of said coils and a resistance in series with and a reactance in shunt with the other of said coils across the alternating circuit on which the indicator is used for producing a rotating field and for varying automatically the phase relations of the currents in said coils to an extent sufficient to render the indications independent of frequency.

In witness whereof, we have hereunto set our hands this 27th day of September, 1909.

LEWIS T. ROBINSON.
MATIE D. HOLZ,
*Executrix of the estate of Otto Holz, deceased.*

Witnesses:
 EDWARD WILLIAMS,
 BENJAMIN B. HULL.